Sept. 29, 1953  G. A. SWARTZ  2,653,647
DIE MOUNTING FOR CRIMP-SEALING MACHINES
Filed May 4, 1951  5 Sheets-Sheet 1
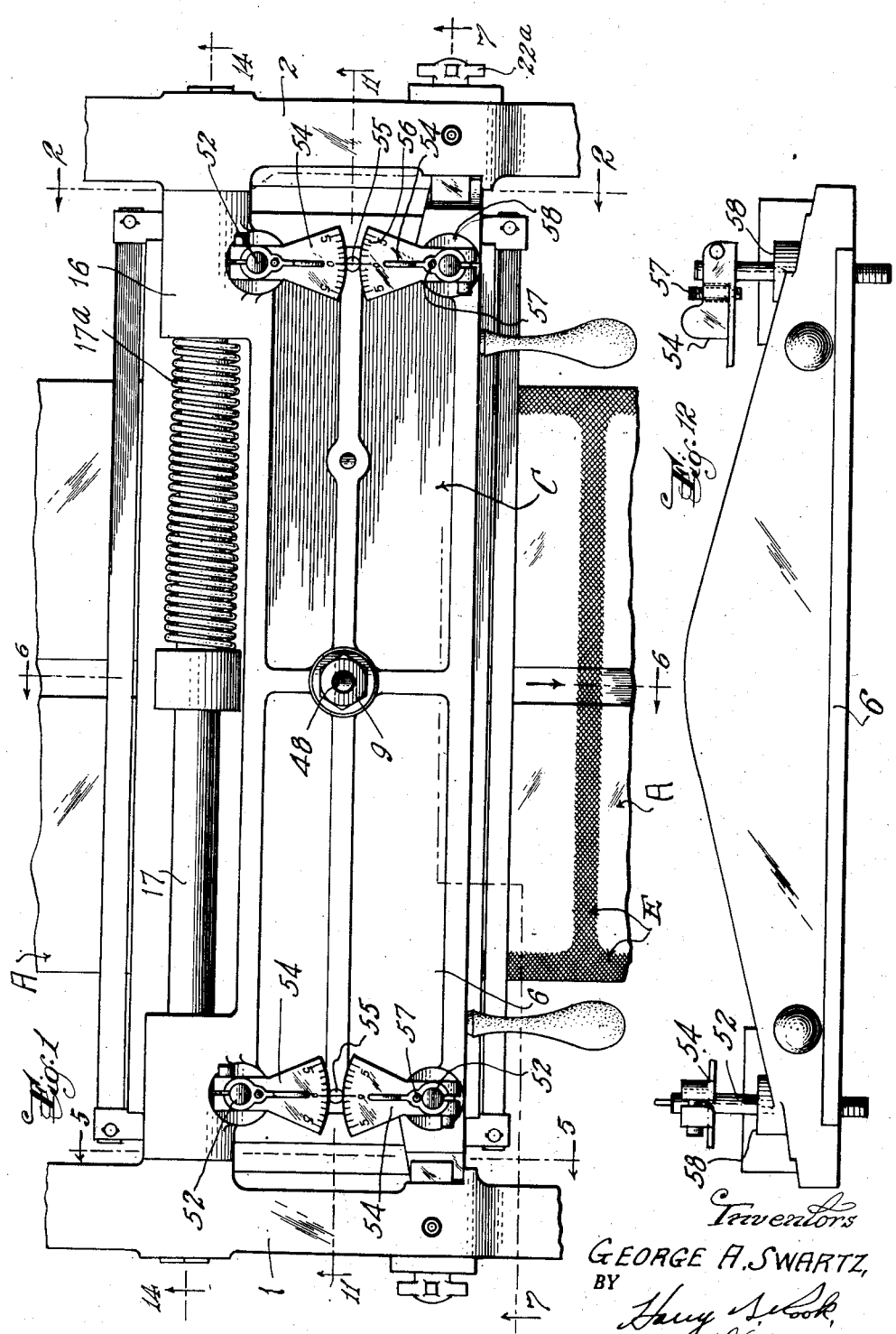
INVENTORS
GEORGE A. SWARTZ,
BY

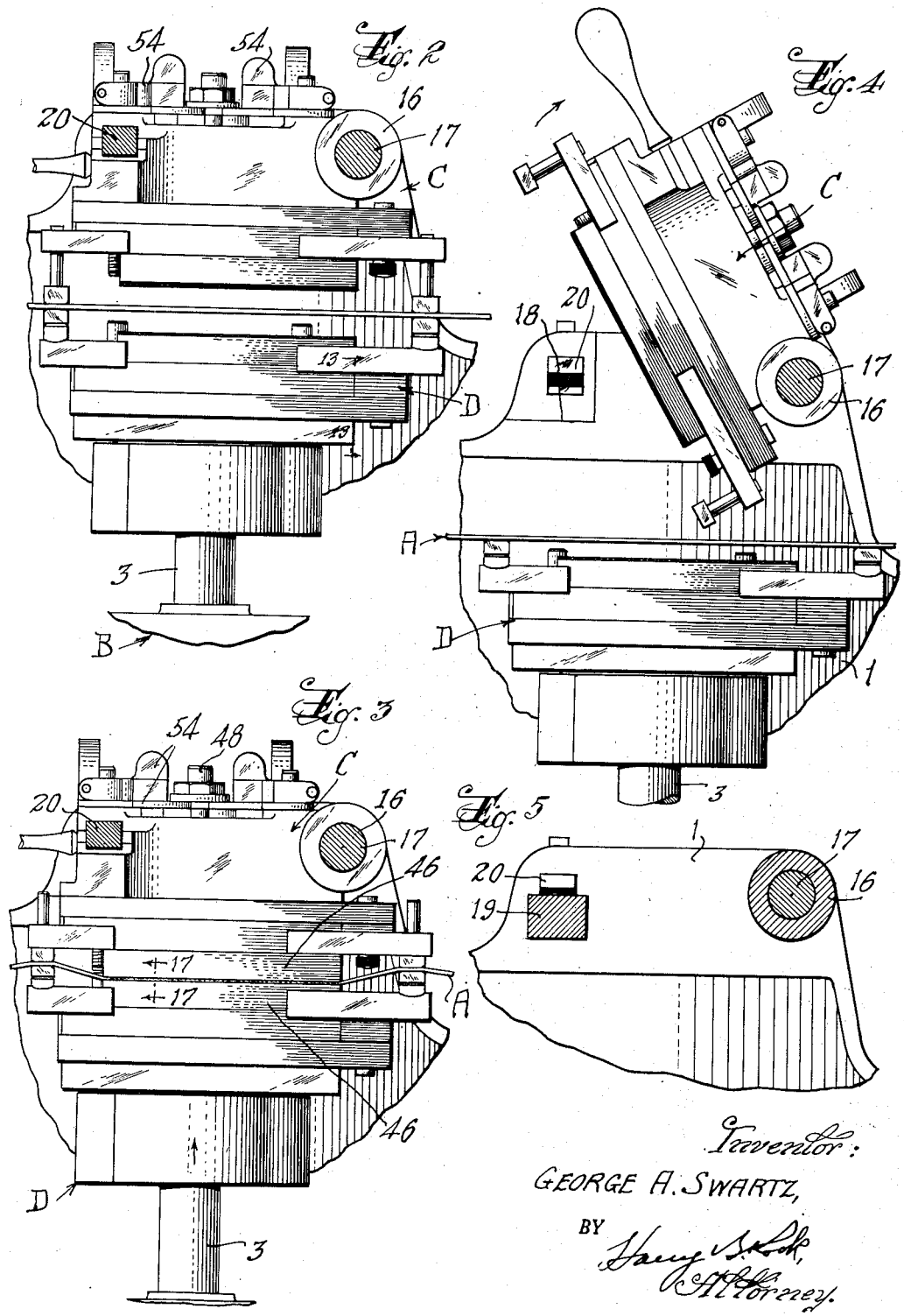

Sept. 29, 1953     G. A. SWARTZ     2,653,647
DIE MOUNTING FOR CRIMP-SEALING MACHINES
Filed May 4, 1951     5 Sheets-Sheet 3
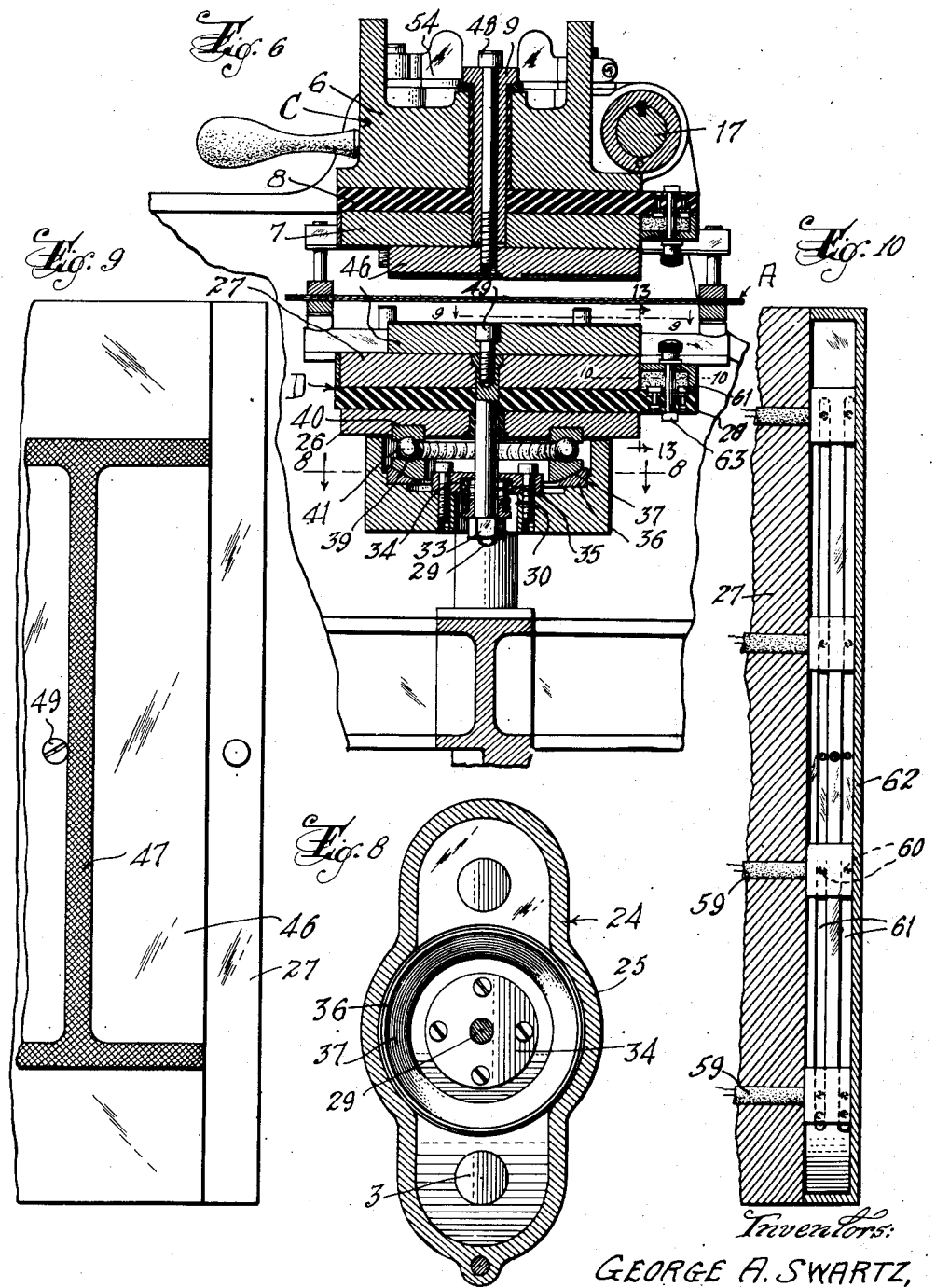
Inventor:
GEORGE A. SWARTZ,
BY Sept. 29, 1953 G. A. SWARTZ 2,653,647
DIE MOUNTING FOR CRIMP-SEALING MACHINES
Filed May 4, 1951 5 Sheets-Sheet 4
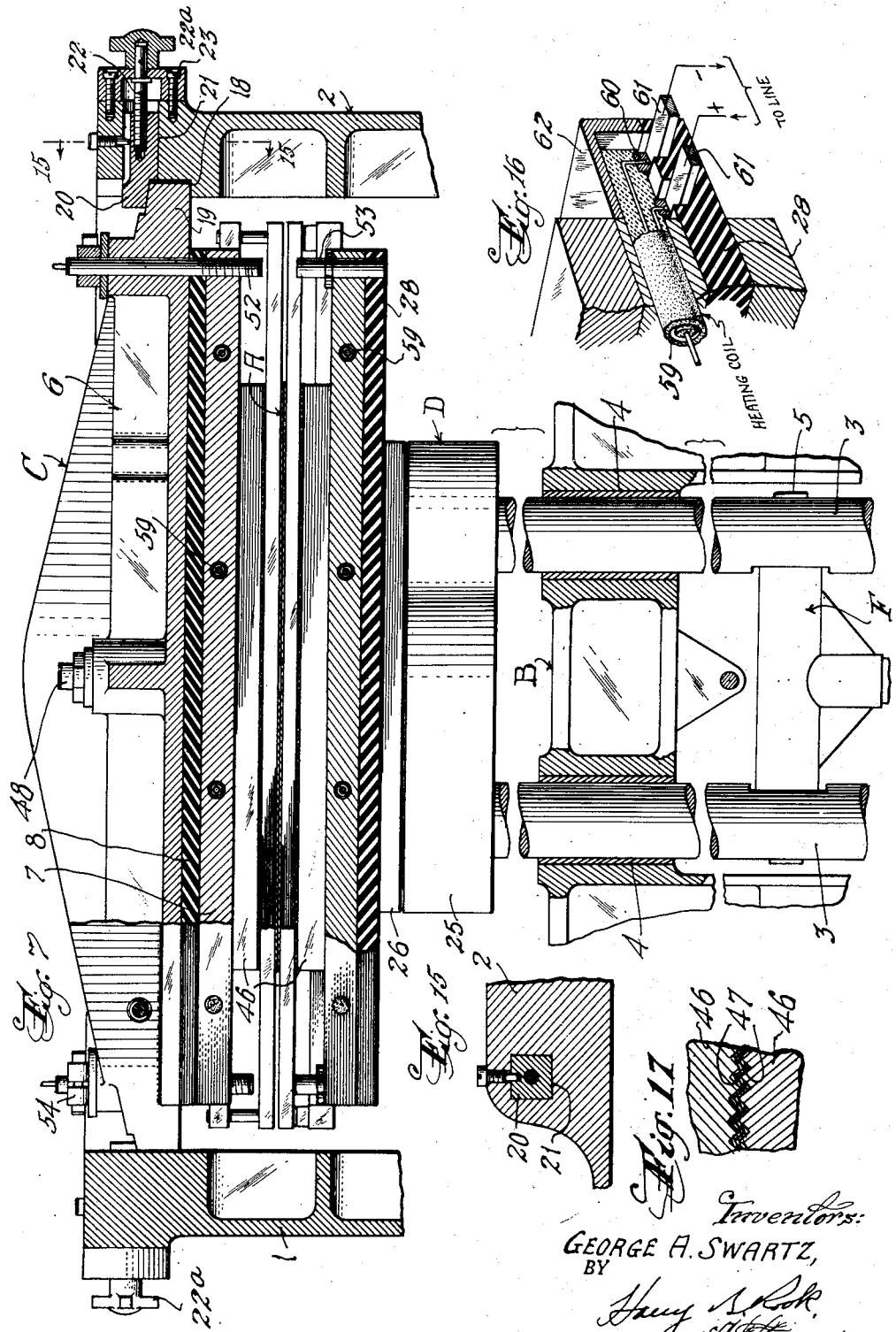
Inventor:
GEORGE A. SWARTZ,
BY
Attorney.

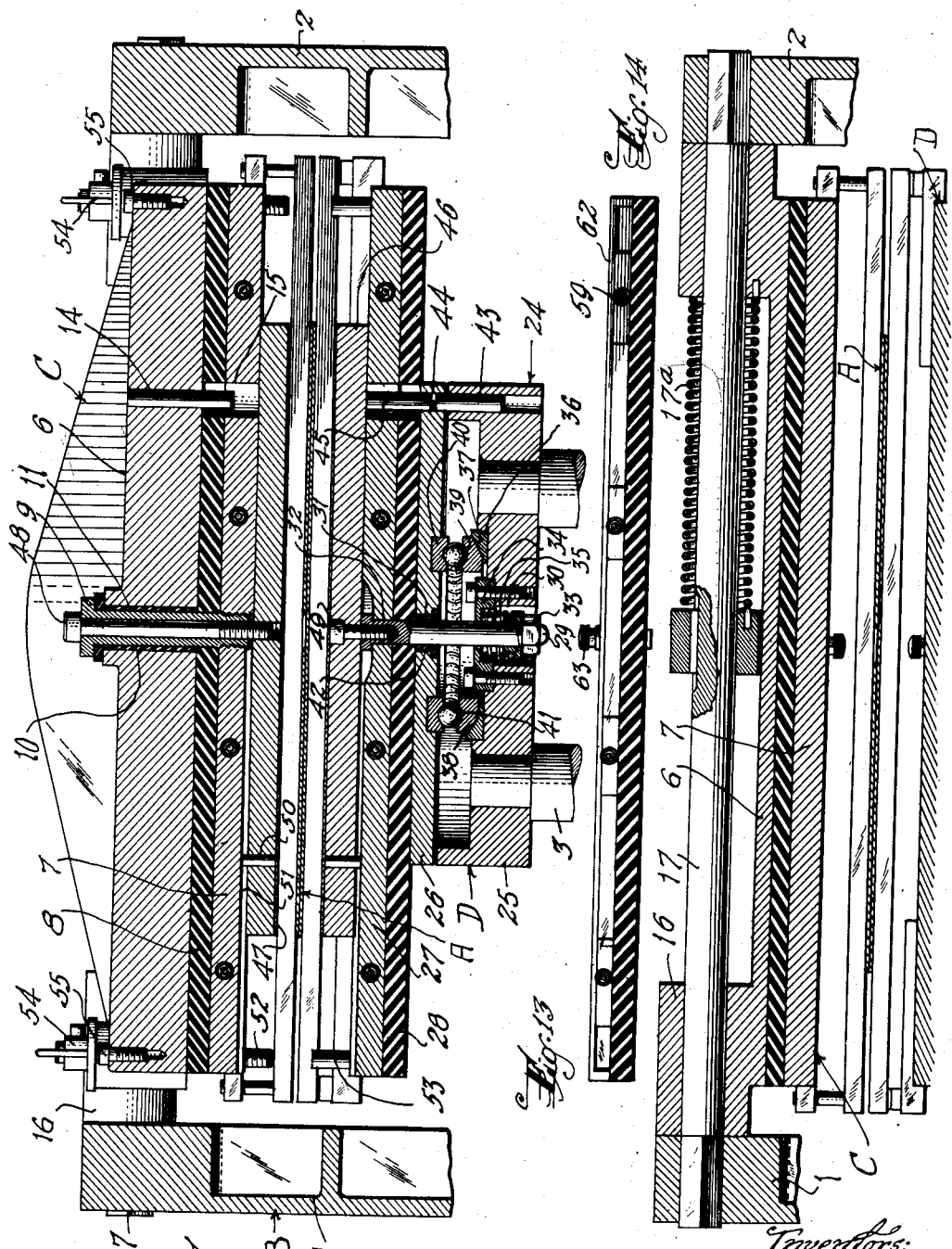

Patented Sept. 29, 1953

2,653,647

UNITED STATES PATENT OFFICE 2,653,647

DIE MOUNTING FOR CRIMP-SEALING MACHINES

George A. Swartz, Millington, N. J., assignor to Ivers-Lee Company, Newark, N. J., a corporation of Delaware Application May 4, 1951, Serial No. 224,596

6 Claims. (Cl. 154—42)

This invention relates to machines of the type wherein layers or strips of material, particularly packaging material such as rubber hydrochloride, "cellophane" or metal foil, are pressed or sealed together between dies, for example for closing packages or for attaching labels or covers to packages; and more particularly the invention contemplates such a machine wherein the faces of the dies are serrated, corrugated or have teeth for crimping material.

One object of the invention is to provide in such a machine novel and improved means for insuring that the meeting faces of the two dies shall accurately engage each other even under high pressure so as to provide a uniform pressure throughout the area of the strips of material to be pressed or sealed together and also to insure proper alignment and meshing of the crimping teeth, corrugations or serrations.

In such machines at least one of the dies is actuated toward the other, and another object of the invention is to provide a novel and improved construction for at least the movable die which shall include a main or body portion and a secondary or face portion mounted on said body portion for automatic alignment and uniform engagement throughout its area with the other die.

Another object is to provide in a machine of this character, a universal joint between the main die portion and the secondary die portion whereby the latter may rock in all directions relatively to the former and thereby permit accurate adjustment of its face to properly engage the face of the other die.

A further object is to provide a machine which shall include two dies one of which is movable toward and from the other, and novel and improved cooperative abutment elements on the two dies to ensure parallelism of the die faces during the crimping or sealing operation.

A still further object is to provide a machine which shall include a frame, a die movable in said frame toward and from another die, and a novel mounting of the second-mentioned die to permit the latter to be swung into and out of operative relation to the movable die for easy and complete access to both of the dies and to the material between the dies.

Other objects, advantages and results of the invention will be brought out by the following description in conjunction with the accompanying drawings in which:

Figure 1 is a fragmentary top plan view of a portion of a machine frame and dies mounted thereon and embodying the invention;

Figure 2 is a vertical sectional view approximately on the plane of the line 2—2 of Figure 1, showing the dies open or spaced apart;

Figure 3 is a similar view showing the dies closed or in sealing or crimping relation to each other;

Figure 4 is a view similar to Figure 2 showing one of the dies swung away from the other for access to the dies and to the material between them;

Figure 5 is a fragmentary vertical sectional view approximately on the plane of the line 5—5 of Figure 1;

Figure 6 is a transverse vertical sectional view approximately on the plane of the line 6—6 of Figure 1;

Figure 7 is a vertical longitudinal sectional view approximately on the plane of the line 7—7 of Figure 1;

Figure 8 is a horizontal sectional view approximately on the plane of the line 8—8 of Figure 6;

Figure 9 is a fragmentary top plan view of the lower or movable die approximately on the plane of the line 9—9 of Figure 6;

Figure 10 is a fragmentary horizontal sectional view approximately on the plane of the line 10—10 of Figure 6;

Figure 11 is a vertical longitudinal sectional view on the plane of the line 11—11 of Figure 1 showing the dies in open position;

Figure 12 is a front elevational view of the main portion of the upper die showing the abutment means for insuring the parallelism of the faces of the two dies;

Figure 13 is a fragmentary vertical sectional view approximately on the plane of the line 13—13 of Figure 6;

Figure 14 is a fragmentary vertical longitudinal sectional view approximately on the plane of the line 14—14 of Figure 1;

Figure 15 is a fragmentary transverse vertical sectional view on the plane of the line 15—15 of Figure 7;

Figure 16 is a fragmentary sectional perspective view through a portion of the lower die showing the electrical connection for the heater elements; and Figure 17 is a greatly enlarged fragmentary vertical sectional view approximately on the plane of the line 17—17 of Figure 3.

The apparatus embodying the invention generally will be associated in the same frame with means for supplying the strips or layers of material A to be sealed or pressed together, means for severing the layers after the pressing or sealing thereof and motor driven actuating mechanism for the movable die such as that disclosed in my co-pending application Serial No. 223,921, filed May 1, 1951, and in the accompanying drawings B designates such a machine frame that is shown as comprising two spaced side pieces 1 and 2 between which is mounted an upper die C with which cooperates a lower die D that is vertically movable toward and from the upper die to press or crimp-seal together the layers of flexible material A, which may be rubber hydrochloride, "cellophane," or metal foil.

The lower die D is shown as mounted on vertical support-guide rods 3 which are vertically slidably mounted in suitable bearings 4 in the frame B, and mechanism for vertically reciprocating the die, which may be like that shown in my above-mentioned co-pending application, is connected to said support-guide rods, as shown in Figure 7 where the reference character F designates the upper link of a toggle which is pivotally connected to the rods by a shaft 5.

The present invention relates particularly to the construction and mounting of the dies C and D, and as shown the upper die C comprises a main body portion 6 and a secondary portion 7 rectangular in plan between which portions is a thick sheet of "Transite" or other suitable heat-insulating material 8, and said parts are secured together in super-posed relation by a tubular cap screw 9 that is mounted in an opening 10 in the main portion and screw-threaded into the secondary portion. Preferably a heat resistant lining 11 is interposed between the tubular screw 9 and the walls of the opening 10. A stop pin 14 is mounted in the main portion 6 with one end projecting into a slot 15 in the secondary portion the narrow dimension of which is approximately the same as the diameter of the pin 14, so that the secondary portion is held against rotation relatively to the main portion but the secondary portion may freely expand and contract relatively to the pin 14.

The main portion 6 is pivotally mounted adjacent one longitudinal edge on the frame B, and as shown said main portion has bearings 16 journaled on a pivot rod 17 whose ends are fixed in the side pieces 1 and 2 of the frame as best shown in Figures 1 and 2. With this construction, the upper die may be disposed in parallel relation to the lower die or maybe swung upwardly away from the lower die so as to provide free access to both dies and to the layers of material A disposed between the dies, as shown, for example, in Figure 4. Preferably a torque spring 17a is provided to hold the die in elevated position.

For locking the upper die in proper juxtaposed relation to the lower die, the side pieces 1 and 2 of the frame have seats 18 for lugs 19 on the ends of the main portion 6 of the die, and latch blocks 20 are slidably mounted in openings 21 in the side pieces to engage the upper sides of the respective lugs 19 and hold the latter on their seats 18. The latch blocks 20 are longitudinally adjustable into and out of engagement with the lugs 19 by screws 22 rotatable by handles 22a in bearings 23 on the frame and screw-threadedly connected to the respective latch block. As shown, the contacting surface of the latch blocks and the lugs 19 are inclined so as to provide a wedging action as the latch blocks are pressed into engagement with the lugs.

The lower die D comprises a main or body portion 24 which includes a bottom section 25 and a top section 26 rectangular in plan upon which is mounted the secondary portion 27 between which and the top section 26 of the main portion is interposed a sheet of suitable heat insulating material 28. The main and secondary portions of the lower die are connected together by a central bolt 29 which passes through a central opening 30 in the main portion 24, through an opening 31 in the top section 26 and through an opening 32 in the secondary portion 27 against which the head of the bolt abuts. Between the nut 33 of the bolt and a bearing plate 34 in the opening 30 is a spring 35. Preferably a heat insulating lining 42 is interposed between the bolt 29 and the walls of the opening 31 in the top section 26.

An important feature of the invention is a universal mounting of the secondary portion on the main portion of at least one die to permit the face of at least said one die to tilt in all directions so as to insure proper engagement of the faces of the two dies, and as shown the main portion 24 of the lower die has a bearing ring 36 concentric with the bolt 29 and having an upwardly facing concave spherical surface 37 in the form of a segment of the surface of a sphere that is approximately concentric with the point of intersection of the axis of the bolt 29 with the plane of the face of the die. Cooperating with said surface 37 is a downwardly facing correspondingly shaped convex surface of an auxiliary bearing ring 38. The bearing ring 38 also serves as a race ring 39 cooperating with another race ring 40 of a ball bearing which includes balls 41 disposed between the race rings in the usual manner. The top section 26 of the die is spaced from the bottom section 25, and with this construction, it will be observed that the bearing ring 38 may slide relatively to the bearing ring 36 and the balls 41 provide a sensitive seat for the top section 26 on the bottom section 25, whereby the secondary portion of the die may readily tilt without relative sidewise or lateral movement of said die faces to properly adjust its face to the face of the upper die as the two dies are brought into material-pressing or sealing engagement. Also, a stop pin 43 is mounted in the lower section 25 of the die and projects into an opening slot 44 in the top section 26 in which is secured a stop pin 45 that projects into an elongated slot in the secondary portion 27 whereby the sections 25, 26 and portion 27 of the die are held against relative rotation but portion 27 can freely expand and contract.

The faces of the dies may widely vary and preferably are interchangeable, and for this purpose there is a die block 46 separably secured to the secondary portion of each die having a material-engaging face serrated, corrugated or formed with any suitable crimping surface 47. One die block 46 is secured to the upper die by a cap screw 48 and the other die block is secured to the lower die by a cap screw 49, and suitable positioning pins 50 on the die blocks engage slots 51 on the secondary portions of the dies to properly locate the die blocks.

It is also desirable to provide means for insuring proper parallelism of the faces of the die blocks, and for this purpose I have provided an abutment screw 52 at each of the four corners of the upper die to engage abutment posts 53 on the lower die, the screws 52 being threaded into the upper die as best shown in Figure 7 and having combined finger pieces and scale plates 54 at their upper ends cooperating with indicators 55 on the top of the die for adjusting the screws in either direction. As shown, the scales 56 indicate longitudinal movement of the screws from zero to five thousandths of an inch in either direction. Lock screws 57 may be provided in the finger pieces to frictionally engage the tops of bosses 58 on the die for locking abutment screws 52 in adjusted positions.

Where heat sealable material is to be operated upon, one or both of the dies may be heated in any suitable manner. As shown, a plurality of electrical heating elements 59 are arranged in each of the secondary portions of the dies with electrical contact elements 60 engaging bus bars 61 that may be mounted in extensions of the insulating sheets 8 and 28 when the latter are of electrical insulating material. The bus bars 61 may be connected in circuit in any suitable manner and a removable cover plate 62 preferably encloses the electrical conducting elements 60 and 61 and the ends of the heaters, being separably attached to the respective dies by clamping screws 63.

While the invention has been shown and described as embodied in certain structural details, it should be understood that the construction of the dies may be widely modified and changed within the spirit and scope of the invention, and the die faces may be formed to provide crimped zones E on the layers of material A of any suitable form and at any desired position.

Those skilled in the art will also understand that the balls 40 and their races might be omitted, but they are desirable in that in addition to providing a sensitive and at the same time firm bearing for the secondary portion on the main portion, they also restrict the passage of heat from the secondary portion of the die into the main portion and thence into the machine frame.

I claim:

1. The combination of two dies having faces to crimp sheet material between them, means for actuating at least one of said dies toward the other to move said faces into material-crimping relation to each other, at least one of said dies including a main portion and a secondary portion carrying one of said faces, one of said main and secondary portions having a convex segmentally spherical surface in contact with a concave segmentally spherical surface of the same diameter on the other portion, said surfaces having a common center which lies in the plane of the face of said one die to provide for tilting of said one die to automatically adjust the face thereof to the face of the other die as said faces move into material crimping relation.

2. The combination as defined in claim 1 with the addition of a bearing between said main portion and said secondary portion including races concentric with said segmentally spherical surfaces and balls between said races.

3. The combination as defined in claim 1 with the addition of means yieldingly connecting said main portion and said secondary portion for holding said spherical surfaces in contact with each other.

4. The combination as defined in claim 1 with the addition of a bolt concentric with said spherical surfaces connecting said main and secondary portions and wherein said center of said spherical surfaces is coincident with the point of intersection of the axis of said bolt with the plane of the face of said one die.

5. The combination as defined in claim 1 with the addition of a bolt concentric with said spherical surfaces connecting said main and secondary portions and wherein said center of said spherical surfaces is coincident with the point of intersection of the axis of said bolt with the plane of the face of said one die, said bolt being longitudinally movable in said main portion and with the addition of spring means cooperating with said bolt and said main portion for yieldingly holding said spherical surfaces in sliding contact with each other.

6. The combination as defined in claim 1 wherein said secondary portion is rectangular in plan, and with the addition of pairs of abutment elements, each pair including one abutment element on and adjacent each corner of said secondary portion and another element on the other die to abuttingly engage the corresponding abutment element on said secondary portion, one element of each pair being adjustable toward and from the other element of the same pair to cause adjustment of said secondary portion about said spherical surfaces.

GEORGE A. SWARTZ.

References Cited in the file of this patent

UNITED STATES PATENTS

| Number | Name | Date |
| --- | --- | --- |
| 65,508 | Rodgers | June 4, 1867 |
| 334,055 | Shaw | Jan. 12, 1886 |
| 530,733 | Tower | Dec. 11, 1894 |
| 1,604,452 | Krusemark | Oct. 26, 1926 |
| 1,718,485 | O'Sullivan | June 25, 1929 |
| 1,744,393 | Holland-Letz | Jan. 21, 1930 |
| 1,830,647 | Engel | Nov. 3, 1931 |
| 1,883,542 | Campbell | Oct. 18, 1932 |
| 1,949,275 | Heintz | Feb. 27, 1934 |
| 1,983,705 | Pilblad et al. | Dec. 11, 1934 |
| 2,014,399 | Sprague | Sept. 17, 1935 |
| 2,095,299 | Thweatt et al. | Oct. 12, 1937 |
| 2,128,844 | Myer et al. | Aug. 30, 1938 |
| 2,508,301 | Stacy | May 16, 1950 |

FOREIGN PATENTS

| Number | Country | Date |
| --- | --- | --- |
| 40,350 | Switzerland | July 1, 1907 |